US010126021B2

(12) United States Patent
Bossmann et al.

(10) Patent No.: US 10,126,021 B2
(45) Date of Patent: Nov. 13, 2018

(54) METAL-CERAMIC COATING FOR HEAT EXCHANGER TUBES OF A CENTRAL SOLAR RECEIVER AND METHODS OF PREPARING THE SAME

(71) Applicant: General Electric Technology GbmH, Baden (CH)

(72) Inventors: Hans-Peter Bossmann, Lauchringen (DE); Maryam Bahraini Hasani, Lupfig (CH)

(73) Assignee: General Electric Technology GmbH, Baden (CH)

( * ) Notice: Subject to any disclaimer, the term of this patent is extended or adjusted under 35 U.S.C. 154(b) by 89 days.

(21) Appl. No.: 15/211,195

(22) Filed: Jul. 15, 2016

(65) Prior Publication Data

US 2018/0017290 A1    Jan. 18, 2018

(51) Int. Cl.

| | |
|---|---|
| *F24J 2/48* | (2006.01) |
| *F24S 70/20* | (2018.01) |
| *C23C 4/129* | (2016.01) |
| *C23C 4/131* | (2016.01) |
| *C23C 4/134* | (2016.01) |
| *C23C 24/02* | (2006.01) |
| *F28F 13/18* | (2006.01) |
| *F28F 21/04* | (2006.01) |
| *F28F 21/08* | (2006.01) |

(Continued)

(52) U.S. Cl.
CPC ............... *F24S 70/20* (2018.05); *C23C 4/10* (2013.01); *C23C 4/11* (2016.01); *C23C 4/129* (2016.01); *C23C 4/131* (2016.01); *C23C 4/134* (2016.01); *C23C 24/02* (2013.01); *C23C 24/04* (2013.01); *C23C 28/027* (2013.01); *C23C 28/04* (2013.01); *C23C 28/042* (2013.01); *F24S 20/20* (2018.05); *F28F 13/18* (2013.01); *F28F 21/04* (2013.01); *F28F 21/081* (2013.01); *F28F 21/082* (2013.01); *F28F 21/086* (2013.01); *F28F 21/087* (2013.01); *F28F 2013/001* (2013.01)

(58) Field of Classification Search
USPC ........................................................ 126/676
See application file for complete search history.

(56) References Cited

U.S. PATENT DOCUMENTS

| | | | |
|---|---|---|---|
| 4,211,210 A | 7/1980 | Muenker et al. | |
| 4,585,057 A * | 4/1986 | Marburger ............ | F28F 19/002 165/134.1 |

(Continued)

FOREIGN PATENT DOCUMENTS

| | | |
|---|---|---|
| JP | S57-155396 A | 9/1982 |
| WO | 2016/063255 A1 | 4/2016 |

OTHER PUBLICATIONS

International Search Report and Written Opinion issued in connection with corresponding PCT Application No. PCT/EP2017/067641 dated Oct. 25, 2017.

*Primary Examiner* — Avinash Savani
(74) *Attorney, Agent, or Firm* — Dority & Manning, P.A.

(57) ABSTRACT

Provided are metal-ceramic coatings for heat exchanger tubes of a central solar receiver and methods of preparing the same. The metal-ceramic coatings comprise at least one ceramic phase dispersed in a metal matrix and are disposed along the heat exchanger tubes to improve heat transfer and reduce oxidation of the heat exchanger tubes. Methods of preparing the metal-ceramic coatings and systems for using the same are provided.

19 Claims, 2 Drawing Sheets

(51) Int. Cl.
    *C23C 28/02*     (2006.01)
    *C23C 4/10*     (2016.01)
    *C23C 24/04*     (2006.01)
    *C23C 28/04*     (2006.01)
    *C23C 4/11*     (2016.01)
    *F24S 20/20*     (2018.01)
    *F28F 13/00*     (2006.01)

(56) References Cited

U.S. PATENT DOCUMENTS

| | | | |
|---|---|---|---|
| 5,000,248 A | | 3/1991 | Newkirk et al. |
| 5,338,515 A | * | 8/1994 | Dalla Betta ............ G01N 25/32 |
| | | | 23/293 S |
| 7,740,948 B1 | | 6/2010 | Alvin |
| 9,404,675 B2 | * | 8/2016 | Stettenheim ............ F24J 2/055 |
| 2004/0126594 A1 | * | 7/2004 | Rubbia .................. F24J 2/4652 |
| | | | 428/446 |
| 2006/0131005 A1 | * | 6/2006 | Birk .......................... F28F 9/18 |
| | | | 165/133 |
| 2009/0155479 A1 | * | 6/2009 | Xiao ........................ C23C 4/06 |
| | | | 427/451 |
| 2010/0068556 A1 | | 3/2010 | Lemmon et al. |
| 2011/0041515 A1 | * | 2/2011 | Fraim ...................... F28D 7/16 |
| | | | 62/3.2 |
| 2013/0192588 A1 | * | 8/2013 | Ostermann ............. C25D 7/00 |
| | | | 126/676 |
| 2013/0344238 A1 | | 12/2013 | Clavijo Rivera et al. |
| 2014/0141236 A1 | | 5/2014 | Magdassi et al. |
| 2014/0261390 A1 | | 9/2014 | Chernin et al. |
| 2014/0326236 A1 | | 11/2014 | Magdassi et al. |
| 2015/0176863 A1 | | 6/2015 | Das et al. |

* cited by examiner

METAL-CERAMIC COATING FOR HEAT EXCHANGER TUBES OF A CENTRAL SOLAR RECEIVER AND METHODS OF PREPARING THE SAME

FIELD

Embodiments described herein generally relate to coatings for heat exchanger tubes of central solar receivers and methods of preparing the same.

BACKGROUND

Solar thermal technology concentrates solar radiation by using mirrors (also referred to as "heliostats") to direct solar radiation to a central tower receiver. In the central tower receiver (also referred to as the "central solar receiver"), solar energy is absorbed as heat and converted into electricity. Within the central tower receiver are heat exchangers for transferring heat to a heat transfer fluid, which is then used to produce steam to run a turbine and extract work to produce electricity. Considering the amount of energy directed to the central solar receiver, materials for the central solar receiver must be able to withstand operating temperatures of 700° C. or more and still have high absorptivity. To improve the stability of the materials at high temperatures and the absorptivity of the materials, coatings have been applied to components of the central solar receiver, such as the heat exchanger tubes.

Coatings for solar receiver heat exchangers can greatly impact the performance of a solar plant as the coating can greatly affect the efficiency of the solar energy absorption. However, while such coatings may have a high absorption, the coatings are typically not oxidation resistant. Once exposed to high temperatures, oxidation of the heat exchanger tubes results in oxidation products that interfere with the performance of the heat exchanger. For example, an oxide layer formed at the interface between the heat exchanger substrate and coating may reduce the mechanical properties and thermal heat transfer of the system. For instance, polymer based coatings that are to be vitrified after post-heat treatment do not provide oxidation resistance. Typically, vitrification does not take place completely, leaving the coating with low oxidation resistance. The oxidation can lead to cracks in the coating and, over time, increase the difference in the thermal expansion of the coating and the heat exchanger materials leading to spallation of the coating.

Accordingly, there remains a need for improved coatings for heat exchanger tubes and methods of making such coatings to increase absorption of solar radiation while also decreasing oxidation of the heat exchanger tubes.

BRIEF DESCRIPTION

Aspects and advantages of the invention will be set forth in part in the following description, or may be obvious from the description, or may be learned through practice of the invention.

A central solar receiver heat exchanger tube with a metal-ceramic coating is generally provided, along with methods of preparing a metal-ceramic coated central solar receiver heat exchanger. In one embodiment, the central solar receiver heat exchanger includes a heat exchanger tube defining a surface, wherein the heat exchanger tube includes a base material; and a metal-ceramic coating disposed along the surface of the heat exchanger tube, wherein the metal-ceramic coating includes a metal matrix with at least one ceramic phase dispersed in the metal matrix. In some embodiments, the at least one ceramic phase includes a non-oxide ceramic material and the non-oxide ceramic material includes SiC, $Si_3N_4$, $Ti_3SiC_2$, $Ti_4SiC_3$, $Ti_2AlC$, $Ti_3AlC_2$, $Cr_2AlC$, or combinations thereof. In some embodiments, at least one ceramic phase includes an oxide ceramic material, and the oxide ceramic material includes $Co_3O_4$, $TiO_2$, $SiO_2$, $Fe_2O_3$, $Fe_3O_4$, $Mn_2O_3$, or combinations thereof.

In one embodiment, the metal-ceramic coating includes a first ceramic phase and a second ceramic phase dispersed in the metal matrix, and the first ceramic phase includes a non-oxide ceramic material and the second ceramic phase includes an oxide ceramic material. In other embodiments, the metal-ceramic coating includes a first metal-ceramic layer and a second metal-ceramic layer. The first metal-ceramic layer includes a first metal matrix and a non-oxide ceramic material dispersed in the first metal matrix, and the second metal-ceramic layer includes a second metal matrix and an oxide ceramic material dispersed in the second metal matrix.

In certain embodiments, the metal matrix and/or base material of the heat exchanger tube includes a nickel-based super alloy or steel.

The central solar receiver heat exchanger tube, in some embodiments, has a metal-ceramic coating with a thermal conductivity of greater than or equal to about 25 W/mK and, in some embodiments, an absorption coefficient for solar radiation of at least 90%.

In certain embodiments, the metal-ceramic coating is configured on the heat exchanger tube base material to reduce oxidation of the heat exchanger tube base material, and may be disposed along the radiation portion of the heat exchanger tube base material.

In some embodiments, the ceramic phase of the metal-ceramic coating has a volume fraction of about 0.2 to about 0.8 of the metal-ceramic coating. For instance, in some embodiments, the first metal-ceramic layer and/or the second metal-ceramic layer has a volume fraction of ceramic material of about 0.2 to about 0.8 of the first metal-ceramic layer.

Aspects of the present disclosure are also directed to methods of preparing a metal-ceramic coated central solar receiver heat exchanger. In some embodiments, the method includes steps of applying a metal-ceramic coating onto a surface of a heat exchanger tube, wherein the heat exchanger tube includes a base material, and wherein the metal-ceramic coating includes a metal matrix with at least one ceramic phase dispersed in the metal matrix. In certain embodiments, the step of applying the metal-ceramic coating includes applying a first metal-ceramic layer and applying a second metal-ceramic layer, wherein the first metal-ceramic layer includes a non-oxide ceramic material and the second metal-ceramic layer includes an oxide ceramic material. The non-oxide ceramic material may include SiC, $Si_3N_4$, $Ti_3SiC_2$, $Ti_4SiC_3$, $Ti_2AlC$, $Ti_3AlC_2$, $Cr_2AlC$, or combinations thereof, and the oxide ceramic material may include $Co_3O_4$, $TiO_2$, $SiO_2$, $Fe_2O_3$, $Fe_3O_4$, $Mn_2O_3$, or combinations thereof. In some embodiments, the metal matrix includes a nickel-based super alloy or steel.

Aspects of the present disclosure are also directed to systems for solar heat transfer. In certain embodiments, the system includes a central solar receiver including one or more heat exchanger tubes, wherein the one or more heat exchanger tubes includes a material and a metal-ceramic coating disposed along a surface of the heat exchanger tube, wherein the metal-ceramic coating includes a metal matrix with at least one ceramic phase dispersed in the metal matrix.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
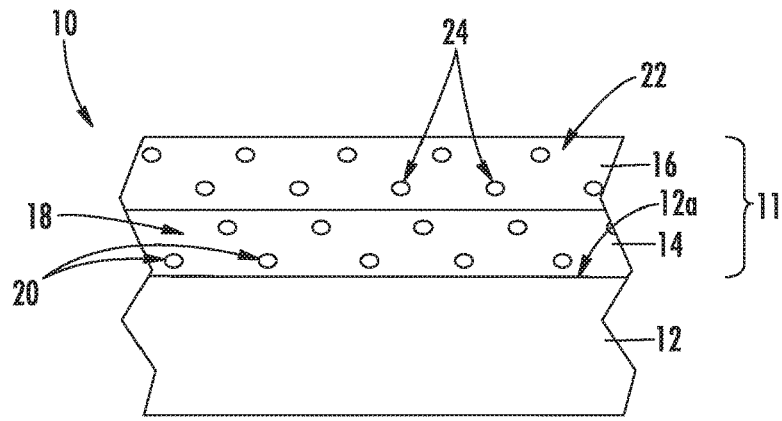
FIG. 1 is a schematic cross sectional view of a surface of an exemplary heat exchanger tube of a central solar receiver in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

A metal-ceramic coating is generally provide for heat exchanger tubes in central solar receivers that not only exhibits high absorption, but also exhibits high thermal conductivity, high oxidation resistance, high thermal expansion coefficient, and high fracture toughness. In certain embodiments, the metal-ceramic coating may comprise a metal matrix with a ceramic phase. The coating may provide oxidation resistance at high operating temperatures, such as about 500° C. to about 750° C. In some embodiments, the coating may comprise one or more non-oxide ceramic materials. The non-oxide ceramic materials may provide a high thermal conductance, such as greater than about 30 W/mK at 700° C. In some embodiments, the coating may comprise one or more oxide ceramic materials. The oxide ceramic materials may provide high oxidation resistance and solar radiation absorbance, such as more than about 90%.

The metal-ceramic coatings provide, in certain embodiments, high absorbance in the solar spectrum, high thermal transfer, and are stable in air at high temperatures. As such, the application of the metal-ceramic coating, particularly metal-ceramic coatings comprising a metal matrix including dispersed ceramic phases of non-oxide and/or oxide ceramic materials, provides high absorptivity, thus improving solar receiver efficiency, and provides high thermal transfer and are oxidation resistant, thus providing stability at high temperatures.

The metal-ceramic coatings provided herein may be suitable for use with central solar receivers, for instance, to coat heat exchanger tubes of a central solar receiver. However, the present coating may also be used in various other applications, particularly in applications where heat transfer, oxidation protection at high temperatures, and/or weight reduction are concerns. For instance, the presently disclosed coating may be used in applications such as gas turbines, steam turbines, and other heat exchangers.

As used herein, "heat exchanger tube" or "heat exchanger tubes" generally refers to one or more cylindrical tubes used in central solar receivers to transfer solar energy to heat transfer fluid. The tubes generally have elongated cylindrical bodies, but may be other suitable shapes such as having a rectangular cross-section or otherwise. The tubes may be made of metal, such as steel or superalloys (e.g., nickel-based superalloys, cobalt-based superalloys, or iron-based superalloys) or other suitable materials for withstanding high temperatures. As used herein, "heat exchanger tube substrate" or "heat exchanger tube base material" refers generally to the material of which the heat exchanger tubes are made, such as the metal or other suitable material. As used herein, the "outer surface of the heat exchanger tube(s)" generally refers to the outermost surface of one or more heat exchanger tubes. The outermost surface is that which would be exposed to the environment without the present metal-ceramic coating. That is, whether the heat exchanger tube comprises one or more layers of materials, the outer surface of the outermost layer will generally be considered the "outer surface of the heat exchanger tube(s)."

As will be described further below, one or more heat exchanger tubes may be at least partially coated with the presently disclosed metal-ceramic coating. For instance, the disclosed metal-ceramic coating may coat one or more heat exchanger tubes to various degrees without deviating from the intent of the present disclosure. As used herein, the "radiated surface" or "radiated surface of the heat exchanger tube(s)" refers generally to the surface of the heat exchanger tube(s) that faces the incoming solar radiation, that is, the solar radiation entering the central solar receiver. The radiated surface of the heat exchanger tube(s) may be at least a portion of the outer surface of the heat exchanger tube(s) or may be the entire outer surface of the heat exchanger tube(s). In certain embodiments of the present disclosure, the metal-ceramic coating disclosed herein coats at least a portion of the radiated surface of the heat exchanger tube(s), while in other embodiments of the present disclosure, the metal-ceramic coating completely coats the radiated surface of the heat exchanger tube(s).

In some embodiments, the metal-ceramic coating may be applied to the outer surface of the heat exchanger such that the metal-ceramic coating has a rough exterior. The rough exterior may increase the real surface of the heat exchanger tube by about 105% or more, such as about 110% to about 130%, compared to the geometrical surface of the heat exchanger tube.

As used herein, "metal-ceramic coating" refers to a composition comprising both a metal and a ceramic. In some embodiments, the composition comprises a metal matrix with a ceramic phase dispersed throughout the matrix, which may more specifically be referred to as a "metallic matrix-ceramic compound" or "metallic matrix-ceramic coating." The ceramic phase may be dispersed uniformly throughout the metal matrix or may be dispersed in discrete sections of the metal matrix. For instance, the ceramic phase may be dispersed in an outer section of the metal matrix or may be dispersed in an inner section of the metal matrix. Variations in the dispersion of the ceramic phase are possible without deviating from the intent of the present disclosure. In such an embodiment, the ceramic phase can be a discontinuous phase within the metal matrix or a continuous phase within the metal matrix.

As used herein, "first metal-ceramic layer" and "second metal-ceramic layer" generally refer to layers of compositions comprising both metal and ceramic. In some embodiments, both a first metal-ceramic layer and a second metal-ceramic layer may be present. In such embodiments, the first metal-ceramic layer is generally positioned between the heat exchanger tube and the second metal-ceramic layer. The first metal-ceramic layer may be positioned directly adjacent to the outer surface of the heat exchanger tube such that the metal-ceramic layer is physically touching the heat exchanger tube which reduces the exposure of the outer surface of the heat exchanger tube to the external environment.

The "metal" in the metal-ceramic coating, such as the "metal matrix," may comprise any suitable metal and may be a metal alloy. For instance, in certain embodiments, the metal may be a metal alloy, such as a nickel (Ni)-based superalloy, cobalt (Co)-based superalloy, iron (Fe)-based superalloy, or a high alloy steel. The metal used in the metal-ceramic coating may be the same or similar to the metal or composition of the heat exchanger tube base material.

As used herein, the "non-oxide ceramic material" refers to ceramic material that lacks an oxide component. In contrast, "oxide ceramic material" refers to ceramic material that comprises an oxide component. In some embodiments, the metal-ceramic coating may comprise one or more non-oxide ceramic materials, while in some embodiments, the metal-ceramic coating may comprise one or more oxide ceramic materials. Still further, in some embodiments, the metal-ceramic coating may comprise at least one non-oxide ceramic material and at least one oxide ceramic material.

Non-oxide ceramic materials include, for example, silicon carbide (SiC), silicon nitride ($Si_3N_4$), titanium silicon carbide (e.g., $Ti_3SiC_2$, $Ti_4SiC_3$), titanium aluminum carbide (e.g., $Ti_2AlC$, $Ti_3AlC_2$), chromium aluminum carbide ($Cr_2AlC$), and combinations thereof.

Oxide ceramic materials include, for example, cobalt oxide (e.g., $Co_3O_4$), titanium dioxide ($TiO_2$), silicon oxide ($SiO_2$) iron oxide (e.g., $Fe_2O_3$, $Fe_3O_4$), manganese oxide (e.g., $Mn_2O_3$), and combinations thereof.

The metal-ceramic coating preferably has a high thermal conductivity, such as greater than about 10 W/mK, or greater than about 15 W/mK or about 20 W/mK, such as greater than about 25 W/mK. Preferably, the oxidation rate of the metal-ceramic coating at temperatures between about 500° C. to about 750° C. of the compound is at least 30% lower than of the corresponding heat exchanger tube material without the metal-ceramic coating. That is, in particular embodiments, the metal-ceramic coating provides a 30% decrease in the oxidation rate compared to the heat exchanger tube material without the metal-ceramic coating. In addition, the metal-ceramic coating, in certain embodiments, provides a high absorption coefficient, such as at least about 80% (e.g., about 85% to about 99%). The inventors have found that the metal-ceramic coating may have an absorption coefficient of at least 90%.

Figure 4:
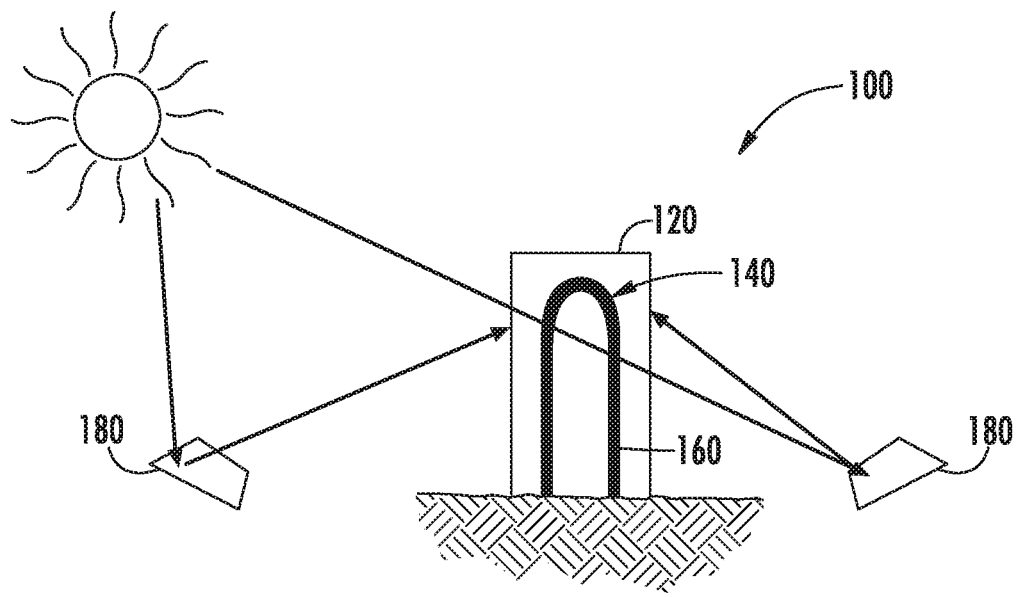
FIG. 4 is a schematic of a system including a heat exchanger tube of a central solar receiver in accordance with one embodiment of the present disclosure.

FIG. 1 is a schematic cross sectional view of a heat exchanger tube 10 of a central solar receiver (e.g., as shown in FIG. 4) in accordance with one embodiment of the present disclosure. In the embodiment illustrated in FIG. 1, the heat exchanger tube 10 includes a heat exchanger base material 12 having a coating 11 on its surface 12a. The coating 11 of the embodiment shown includes a first metal-ceramic layer 14 and a second metal-ceramic layer 16. As shown in FIG. 1, in this embodiment, the first metal-ceramic layer 14 includes a first metal matrix 18 and a first ceramic phase 20. As also shown in FIG. 1, in this embodiment, the second metal-ceramic layer 16 includes a second metal matrix 22 and a second ceramic phase 24. The first metal matrix 18 and second metal matrix 22 may be made of the same material or may be made of different material. Similarly, the first ceramic phase 20 and second ceramic phase 24 may be made of the same material or may be made of different material. In certain embodiments, the first ceramic phase 20 may comprise non-oxide material, while the second ceramic phase 24 may comprise oxide material. In other embodiments, the second ceramic phase 24 may comprise non-oxide material, while the first ceramic phase 20 may comprise oxide material. Still further, other embodiments of the present disclosure may include both ceramic phases 20, 24 comprising a combination of non-oxide and oxide ceramic materials.

As shown in FIG. 1, each of the ceramic phases 20, 24 is dispersed in the respective metal matrix 18, 22 for each of the metal-ceramic layers 14, 16 of the coating. In certain embodiments, the volume fraction of the ceramic phase of the respective metal-ceramic layer and/or of the entire metal-ceramic coating is from about 0.2 to about 0.8, such as about 0.2, about 0.3, about 0.4, about 0.5, about 0.6, about 0.7, or about 0.8.

The metal-ceramic coating 11 (e.g., the metal-ceramic layers) may be disposed on the heat exchanger tube(s) by any suitable method, such as cold gas spray (GDCS), flame spray (e.g., atmospheric plasma spray (APS), high velocity oxygen fuel (HVOF)), wire arc spray, sheet brazing, laser cladding, or combinations thereof.

As shown in FIG. 1, the first metal-ceramic layer 14 is disposed along the outer surface 12a of the heat exchanger tube base material 12. In some embodiments, the coating 11 is disposed along the heat exchanger tube base material 12 such that at least one of the layers 14, 16 are "gas tight" to avoid oxidation of the base material of the heat exchanger tube 12. That is, the metal-ceramic coating 11 is disposed along the outer surface 12a of the base material of the heat exchanger tube 12 to prevent gases, such as oxygen, from entering the interface between the heat exchanger tube base material and the metal-ceramic coating 11 (e.g., the layer 14). Such configuration may reduce oxidation of the base material of the heat exchanger tube 12 and, thus, improve heat transfer and efficiency. Such configuration may also reduce the occurrence of spallation of the coating 11.

In the embodiment illustrated in FIG. 1, the heat exchanger tube 12 is coated with two metal-ceramic layers—a first metal-ceramic layer 14 and a second metal-ceramic layer 16. In other embodiments, the coating 11 may comprise three, four, five, or more metal-ceramic layers with each layer comprising various configurations of metal and ceramic. In addition, the metal-ceramic coating 11 may be used in conjunction with other layers of materials to further improve heat transfer and stability.

Figure 2:
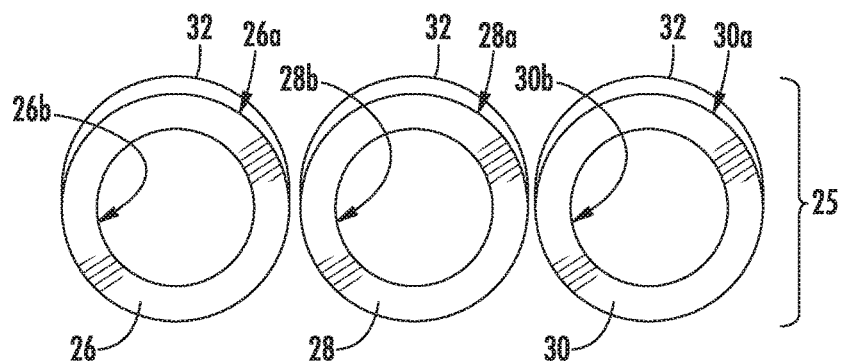
FIG. 2 is a schematic cross sectional view of a plurality of heat exchanger tubes of a central solar receiver in accordance with one embodiment of the present disclosure.

FIG. 2 is a schematic cross sectional view of a plurality 25 of heat exchanger tubes 26, 28, 30 of a central solar receiver in accordance with one embodiment of the present disclosure. The embodiment illustrated in FIG. 2 includes a plurality of heat exchanger tubes (elements 26, 28, and 30). In the embodiment illustrated in FIG. 2, only a portion of the outer surface (elements 26a, 28a, and 30a, respectively) of each heat exchanger tube (elements 26, 28, and 30, respectively) is coated with the metal-ceramic coating 32. Each heat exchanger tube 26, 28, 30 also includes an inner surface (elements 26b, 28b, and 30b, respectively), which comes in contact with the heat transfer fluid for the central solar receiver. In this embodiment, the radiated portion of the outer surface 26a, 28a, and 30a of each heat exchanger tube 26, 28, and 30 is coated with the metal-ceramic coating 32. The metal-ceramic coating 32 may comprise one or more metal-ceramic layers (e.g., as shown in FIG. 1) and may comprise a variety of combinations of non-oxide and oxide ceramic materials. Preferably, the metal-ceramic coating 32 comprises at least one non-oxide ceramic material and at least one oxide ceramic material dispersed in one or more metal matrices.

Figure 3:
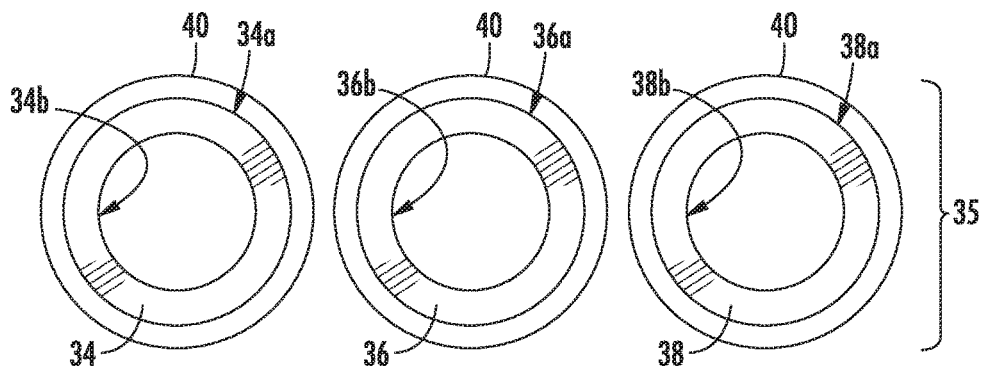
FIG. 3 is a schematic cross sectional view of a plurality of heat exchanger tubes of a central solar receiver in accordance with one embodiment of the present disclosure.

FIG. 3 is a schematic cross sectional view of a plurality 35 of heat exchanger tubes (elements 34, 36, and 38) of a central solar receiver in accordance with one embodiment of the present disclosure. The embodiment illustrated in FIG. 3 includes a plurality 35 of heat exchanger tubes 34, 36, and 38. In the embodiment illustrated in FIG. 3, the outer surface (elements 34a, 36a, and 38a, respectively) of each heat exchanger tube (elements 34, 36, and 38, respectively) is coated with the metal-ceramic coating 40. Each heat exchanger tube 34, 36, and 38 also includes an inner surface (elements 34b, 36b, and 38b, respectively), which comes in contact with the heat transfer fluid for the central solar receiver. In this embodiment, the radiated portion of the outer surface 34a, 36a, and 38a of each heat exchanger tube 34, 36, and 38 as well as the portion of the tube not facing incoming solar radiation is coated with the metal-ceramic coating 40. The metal-ceramic coating 40 may comprise one or more metal-ceramic layers and may comprise a variety of combinations of non-oxide and oxide ceramic materials. Preferably, the metal-ceramic coating 40 comprises at least one non-oxide ceramic material and at least one oxide ceramic material dispersed in one or more metal matrices.

FIG. 4 is a schematic of a system 100 including a heat exchanger tube of a central solar receiver coated with a metal-ceramic coating in accordance with one embodiment of the present disclosure. The solar thermal system 100 illustrated in FIG. 4 includes a central solar receiver 120 that includes one or more heat exchanger tubes 160 in which heat transfer fluid flows. In the embodiment illustrated in FIG. 4, the one or more heat exchanger tubes 160 are coated with a metal-ceramic coating 140 as disclosed herein. FIG. 4 also illustrates the direction of solar energy reflected on one or more heliostats 180 to the central solar receiver 120 where the energy heats the heat transfer fluid flowing in the heat exchanger tubes 160. While not shown in FIG. 4, the heated heat transfer fluid is then used to create electricity by a variety of different methods as known in the art.

Figure 5:
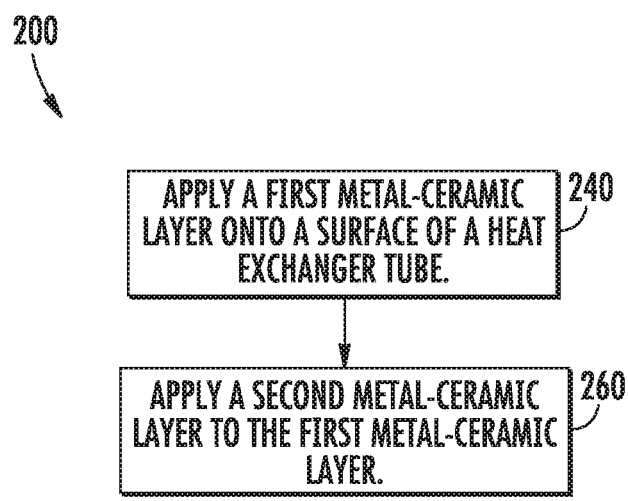
FIG. 5 is a flow chart of a method of preparing coated heat exchanger tubes of a central solar receiver in accordance with one embodiment of the present disclosure.

FIG. 5 is a flow chart of a method of preparing coated heat exchanger tubes of a central solar receiver in accordance with one embodiment of the present disclosure. As shown in FIG. 5, in this embodiment, the method 200 comprises applying a first metal-ceramic layer onto a surface of a heat exchanger tube 240 and applying a second metal-ceramic layer to the first metal-ceramic layer 260. The metal-ceramic layers may be applied by any suitable method such as cold gas spray, HVOF, APS, wire arc spray, sheet brazing, laser cladding, or combinations thereof. The method may comprise other treatments to the heat exchanger tubes between each application of metal-ceramic layer to further improve heat transfer and stability.

Other embodiments may comprise three, four, five, or more applications of metal-ceramic layers with each layer comprising various combinations of metal and ceramic. The metal-ceramic layers may be applied to at least a portion of the outer surface of the heat exchanger tubes and the degree of coverage of the heat exchanger tube by each metal-ceramic layer may vary and may depend on the composition of the metal-ceramic layer. The metal-ceramic layers may comprise one or more non-oxide and oxide ceramic materials. Preferably, the metal-ceramic coating comprising the metal-ceramic layers includes at least one non-oxide ceramic material and at least one oxide ceramic material dispersed in one or more metal matrices.

While the above description focuses on application of the presently disclosed metal-ceramic coating to heat exchanger tubes for central solar receivers, the present coating may also be used in various other applications, particularly in applications where heat transfer, oxidation protection at high temperatures, and/or weight reduction are concerns. For instance, the presently disclosed coating may be used in applications such as gas turbines, steam turbines, and other heat exchangers.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A central solar receiver heat exchanger tube, comprising:
   a heat exchanger tube defining a surface, wherein the heat exchanger tube comprises a base material; and
   a metal-ceramic coating disposed along the surface of the heat exchanger tube, wherein the metal-ceramic coating comprises a metal matrix with at least one ceramic phase dispersed in the metal matrix, and wherein the metal-ceramic coating is configured on the heat exchanger tube base material to reduce oxidation of the heat exchanger tube base material.

2. The central solar receiver heat exchanger tube according to claim 1, wherein the at least one ceramic phase comprises a non-oxide ceramic material, and wherein the non-oxide ceramic material comprises SiC, $Si_3N_4$, $Ti_3SiC_2$, $Ti_4SiC_3$, $Ti_2AlC$, $Ti_3AlC_2$, $Cr_2AlC$, or combinations thereof.

3. The central solar receiver heat exchanger tube according to claim 1, wherein the at least one ceramic phase comprises an oxide ceramic material, and wherein the oxide ceramic material comprises $Co_3O_4$, $TiO_2$, $SiO_2$, $Fe_2O_3$, $Fe_3O_4$, $Mn_2O_3$, or combinations thereof.

4. The central solar receiver heat exchanger tube according to claim 1, wherein the metal-ceramic coating comprises a first ceramic phase and a second ceramic phase dispersed in the metal matrix, and wherein the first ceramic phase comprises a non-oxide ceramic material and the second ceramic phase comprises an oxide ceramic material.

5. The central solar receiver heat exchanger tube according to claim 1, wherein the metal-ceramic coating comprises a first metal-ceramic layer and a second metal-ceramic layer, wherein the first metal-ceramic layer comprises a first metal matrix and a non-oxide ceramic material dispersed in the first metal matrix, and wherein the second metal-ceramic layer comprises a second metal matrix and an oxide ceramic material dispersed in the second metal matrix.

6. The central solar receiver heat exchanger tube according to claim 1, wherein the metal matrix comprises a nickel-based super alloy or steel.

7. The central solar receiver heat exchanger tube according to claim 1, wherein the base material of the heat exchanger tube comprises a nickel-based super alloy or steel.

8. The central solar receiver heat exchanger tube according to claim 1, wherein the thermal conductivity of the metal-ceramic coating is greater than or equal to about 25 W/mK.

9. The central solar receiver heat exchanger tube according to claim 1, wherein the absorption coefficient for solar radiation of the metal-ceramic coating is at least 90%.

10. The central solar receiver heat exchanger tube according to claim 1, wherein the metal-ceramic coating is disposed along the radiation portion of the heat exchanger tube base material.

11. The central solar receiver heat exchanger tube according to claim 1, wherein the ceramic phase comprises a volume fraction of about 0.2 to about 0.8 of the metal-ceramic coating.

12. The central solar receiver heat exchanger tube according to claim 5, wherein the first metal-ceramic layer has a volume fraction of ceramic material of about 0.2 to about 0.8 of the first metal-ceramic layer.

13. The central solar receiver heat exchanger tube according to claim 5, wherein the second metal-ceramic layer has a volume fraction of ceramic material of about 0.2 to about 0.8 of the second metal-ceramic layer.

14. A method of preparing a metal-ceramic coated central solar receiver heat exchanger, the method comprising:

applying a metal-ceramic coating onto a surface of a heat exchanger tube, wherein the heat exchanger tube comprises a base material, wherein the metal-ceramic coating comprises a metal matrix with at least one ceramic phase dispersed in the metal matrix, and wherein the metal-ceramic coating is configured on the heat exchanger tube base material to reduce oxidation of the heat exchanger tube base material.

15. The method of preparing a metal-ceramic coated central solar receiver heat exchanger according to claim 14, wherein applying the metal-ceramic coating comprises applying a first metal-ceramic layer and applying a second metal-ceramic layer, wherein the first metal-ceramic layer comprises a non-oxide ceramic material and the second metal-ceramic layer comprises an oxide ceramic material.

16. The method of preparing a metal-ceramic coated central solar receiver heat exchanger according to claim 15, wherein the non-oxide ceramic material comprises SiC, $Si_3N_4$, $Ti_3SiC_2$, $Ti_4SiC_3$, $Ti_2AlC$, $Ti_3AlC_2$, $Cr_2AlC$, or combinations thereof.

17. The method of preparing a metal-ceramic coated central solar receiver heat exchanger according to claim 15, wherein the oxide ceramic material comprises $Co_3O_4$, $TiO_2$, $SiO_2$, $Fe_2O_3$, $Fe_3O_4$, $Mn_2O_3$, or combinations thereof.

18. The method of preparing a metal-ceramic coated central solar receiver heat exchanger according to claim 14, wherein the metal matrix comprises a nickel-based super alloy or steel.

19. A system for solar heat transfer, comprising:

a central solar receiver comprising one or more heat exchanger tubes, wherein the one or more heat exchanger tubes comprises a material and a metal-ceramic coating disposed along a surface of the heat exchanger tube, wherein the metal-ceramic coating comprises a metal matrix with at least one ceramic phase dispersed in the metal matrix, and wherein the metal-ceramic coating is configured on the heat exchanger tube base material to reduce oxidation of the heat exchanger tube base material.

* * * * *